May 16, 1939. L. E. GODFRIAUX 2,158,058
MACHINE TOOL CHUCK
Filed Jan. 16, 1936 4 Sheets-Sheet 2

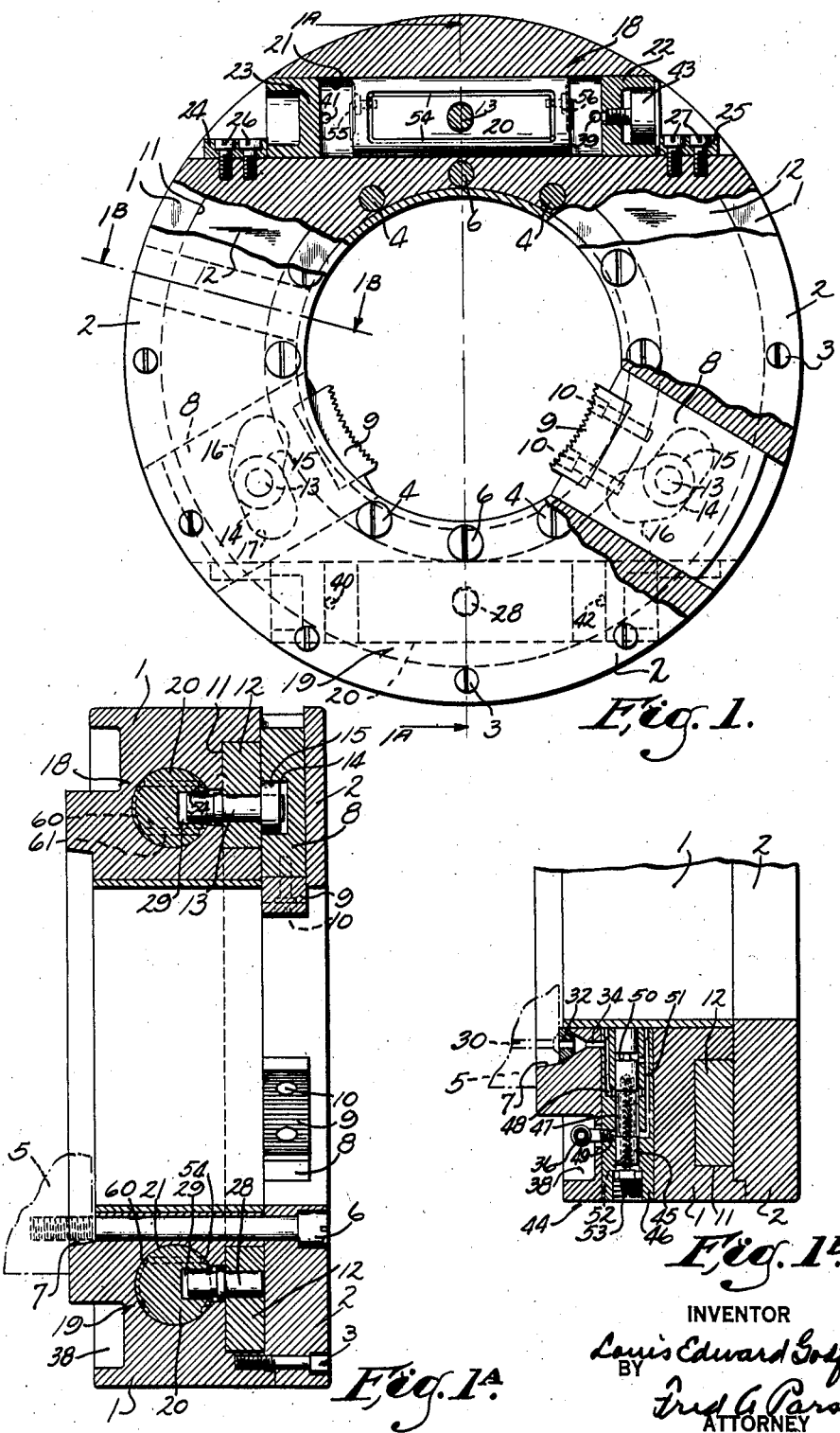

INVENTOR
Louis Edward Godfriaux
BY
Fred G. Parsons
ATTORNEY

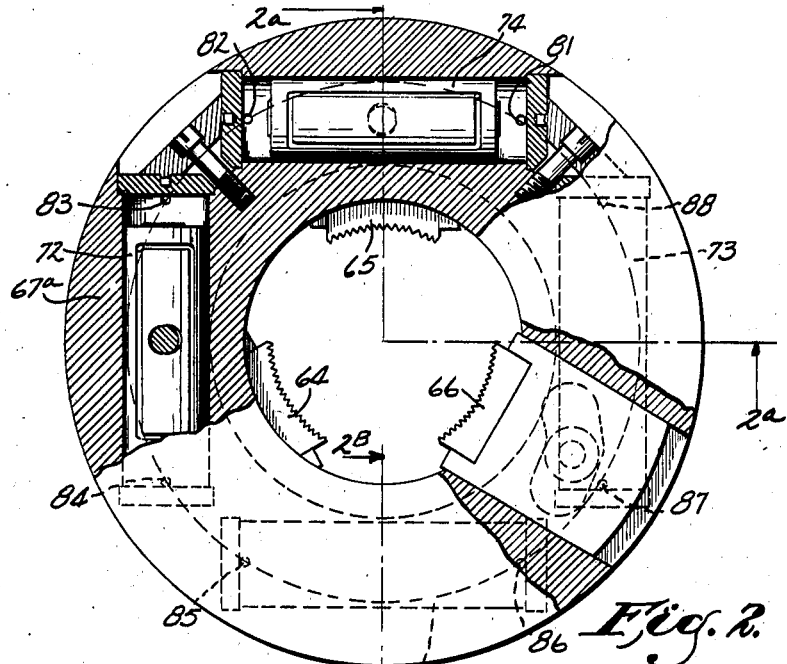
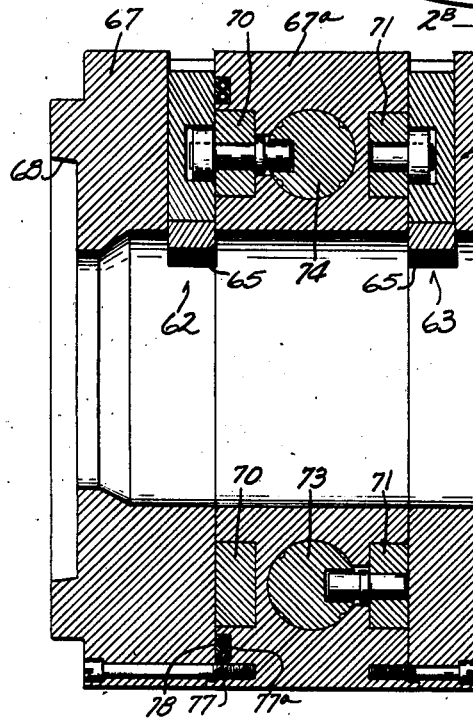
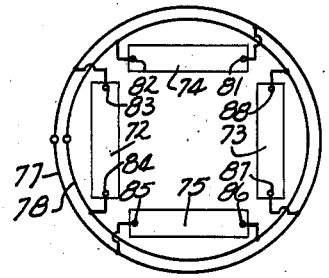
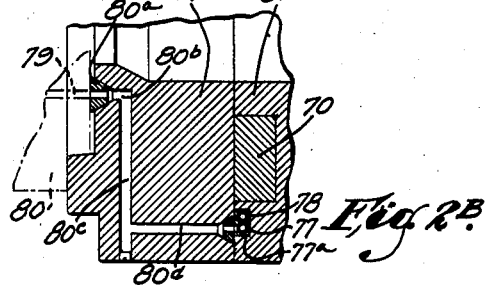

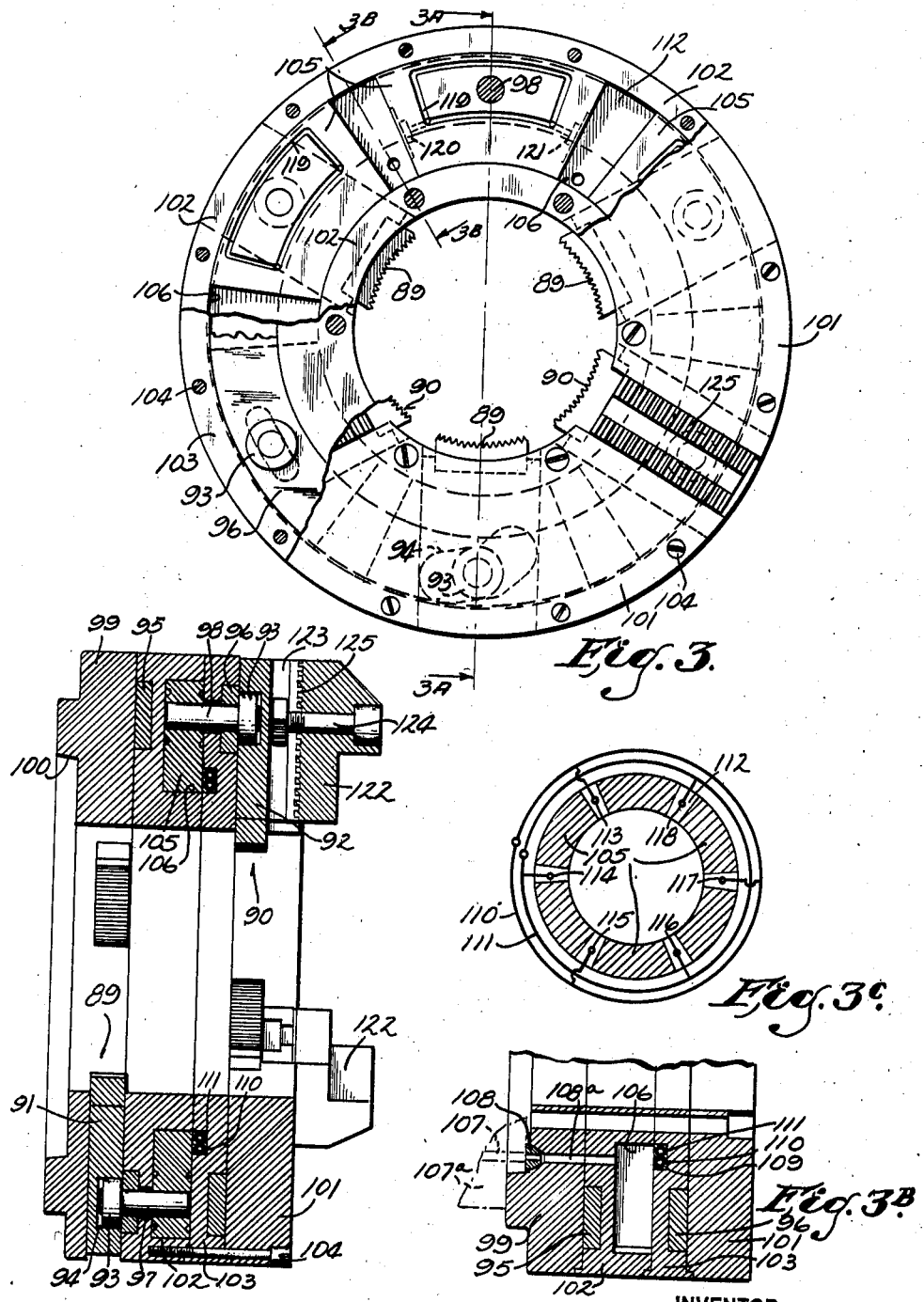

Patented May 16, 1939

2,158,058

UNITED STATES PATENT OFFICE 2,158,058

MACHINE TOOL CHUCK

Louis Edward Godfriaux, Madison, Wis., assignor to Gisholt Machine Company, Madison, Wis., a corporation of Wisconsin Application January 16, 1936, Serial No. 59,335

13 Claims. (Cl. 279—4)

This invention relates to work holding devices for machine tools, and more especially to chucks in which work or tools are to be held for quick release or interchangeability, as for instance in the chucks carried on a lathe spindle.

A purpose of the invention is to provide an improved chuck, in which both the structure essential to the holding of the work or tools, and motor means for power operation thereof, is included in a structure which is unitarily removable and replaceable on the machine, and particularly for lathe chucks.

Another purpose is to provide an improved power operable chuck, particularly adapted for hydraulic operation, and more especially in a lathe chuck.

Another purpose is to provide a chuck, suitable for use in a lathe or other machine tools, and for operation from a power source exterior to or remote from the chuck, and in a manner such that the power operable motor is closely coupled to the chuck elements to be moved thereby.

Another purpose is to provide a power operated chuck, and more particularly a hydraulically operable chuck in which the mechanical train connecting the motor for movement in the clamping direction is of improved self-locking construction and effect in the other direction, whereby the motor cannot be moved by any pressure applied to the clamping elements.

Another purpose is to provide a holding device, particularly a chuck, of an improved form adapted for use with power means and control means, such as is illustrated and described in the co-pending application Serial No. 58,268, filed Jan. 9, 1936, which application matured to Patent 2,093,757 dated Sept. 21, 1937, and of which the present application is a continuation in part.

Another purpose is generally to simplify and improve the construction and operation of chucking devices, both with respect to details of the chuck device itself, and with respect to a construction adapting the chuck to be actuated from an exterior power source, particularly a hydraulic power source, and still other purposes will be apparent from this specification.

The invention consists in the construction and relationship of parts as herein illustrated, described, and claimed, and in such modification of the structure illustrated and described as is equivalent to the structure of the claims.

In the specification the same reference characters have been used to indicate the same parts throughout, and in the drawings, Fig. 1 is a front view, partly in section, of a lathe chuck incorporating the invention.

Fig. 1A is a sectional view of the same chuck taken along line 1A—1A of Fig. 1.

Fig. 1B is a partial section of the same chuck taken along line 1B—1B of Fig. 1.

Fig. 2 is a front elevation, partly in section, of another chuck also incorporating the invention, which is similar to the chuck of Fig. 1, but providing a plurality of sets of clamping jaws spaced apart along the axis of the chuck.

Fig. 2A is a section through the chuck shown in Fig. 2, taken along the line 2A—2A of Fig. 2.

Fig. 2B is a partial section of the chuck shown in Fig. 2, taken along the line 2B—2B of Fig. 2.

Fig. 2C is a diagram showing the fluid supply channel connections for the chuck of Fig. 2.

Fig. 3 is a front view, partly in section, of still another chuck also incorporating the invention, but in a structure of somewhat different form than shown in the chucks of Figs. 1 and 2, particularly as to the fluid operable piston devices.

Fig. 3A is a section taken along line 3A—3A of Fig. 3.

Fig. 3B is a partial section taken along line 3B—3B of Fig. 3.

Fig. 3C is a diagram showing the fluid supply channel connections for the chuck of Fig. 3.

Figure 1C:
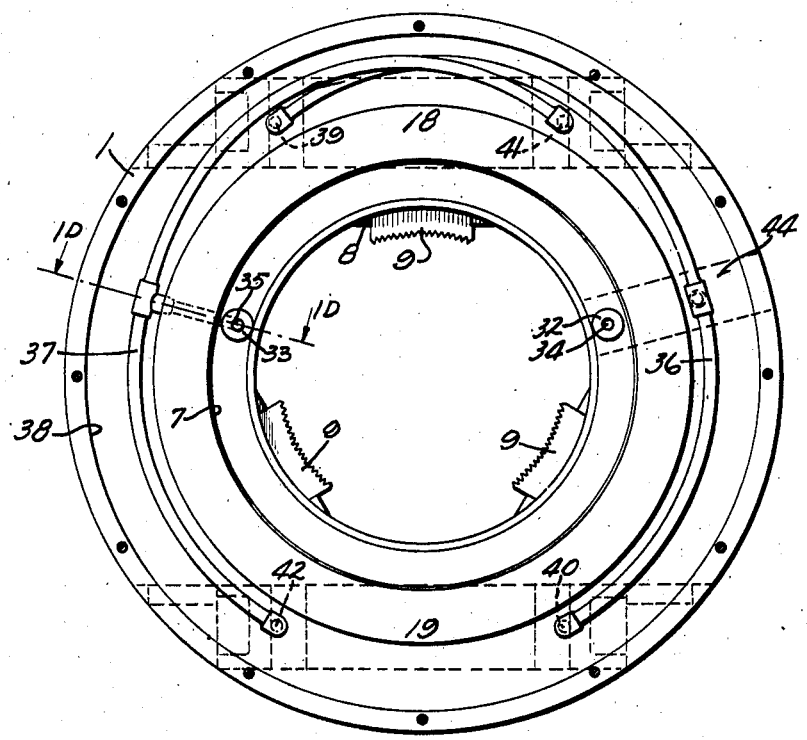
Fig. 1C is a rear view of the same chuck.
Figure 1D:
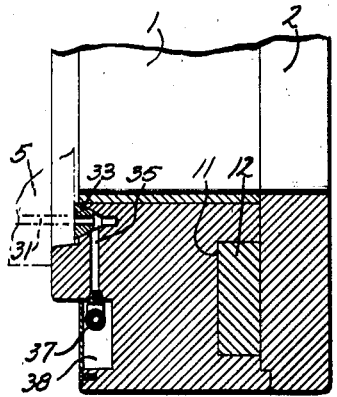
Fig. 1D is a partial section taken along line 1D—1D of Fig. 1C.

The chuck shown in Fig. 1 comprises a main body portion 1 and another body portion 2 rigidly fixed therewith by the means of screws such as 3—4, and adapted to be fixed with a lathe spindle, of which a portion is shown at 5, by the means of screws such as 6 and centered by an annular recess 7. The members or portions 1 and 2 together provide a substantially annular chuck body fitted co-axially with the spindle 5.

The body member 2 is slotted to provide guides for closely fitted members such as 8, each movable toward and from the axis of the body annulus. On the members 8 there may be mounted jaw members such as the members 9, or other suitable forms, fixed with the members 8 by screws such as 10, or by other suitable means. The members 8 are preferably substantially equiangularly spaced, in order to provide a running balance for the chuck unit and to more effectively hold the work piece.

In the body member 1 there is provided an annular recess 11 in which a ring 12 is closely but rotatably fitted. At the points where the ring member 12 is adjacent to the members 8, pins such as 13 are fixed therein and extended within cam recesses such as 14 in the members 8, the cam recesses being adapted to receive follower rolls such as 15 carried by the pins 13. The form of the cam recesses 14 is such that, as the ring 12 is rotated in the one direction, the members 8 are first quickly simultaneously moved toward the axis of the ring annulus, during the first part of the ring movement, while the rolls 15 are passing over a portion such as 16 of the cam path, and during the latter part of the ring movement in the same direction the members 8 are relatively much more slowly moved by a cam portion 17 having relatively slight effective angle. The angle of the cam portion 17 is such that the ring may move the members 8, but pressure on the members in the other direction will not reversely move the ring. In other words the connection is self-locking in the one direction of movement and after the members arrive at clamping position. In the other direction of movement of the ring 12 the members 8 are first unclamped, during movement of the rollers 15 over the cam portion 17, and then quickly moved to the fully opened position by the movement of the rollers 15 over the cam portions 16. It will be understood that cams of equal rise may be used, and in some instances are preferable, as for instance where the chuck is to be used for both internal and external clamping.

For movement of the ring 12 there are provided two piston devices respectively denoted as 18, 19. The piston devices 18, 19 are similar, each including a piston such as 20 closely fitted within a bore such as 21 providing a cylinder in the body 1, which is closed at the ends by plugs such as 22, 23 tightly fitted in the bore and retained in position by abutment blocks such as 24, 25 and screws such as 26, 27. The pistons 20 are also equi-angularly spaced in order to balance the chuck, and are each connected for movement of the ring 12 by the means of pins such as 28 fixed in the ring 12 and projecting into recesses such as 29 at the center of the piston. It may be noted that in the case of the uppermost piston, Fig. 1, a combination pin is used which is fixed in the ring and extends in both directions to connect the ring both with the member 8 and the piston 20.

Each of the piston devices 18, 19 is provided with fluid supply channels for the operation of the pistons in either direction. As more fully explained in the co-pending application previously referred to, pressure fluid is received from spindle 5, through the one or the other of channels 30 or 31, Figs. 1B and 1D, according to the position of control means not shown here. The chuck includes pressure coupling devices 32, 33 for the respective supply channels, from which the fluid is passed to the channels 34 or 35 within the chuck body. The channels 34, 35 are respectively connected to supply pipe channels 36, 37, housed in an annular groove 38 at the rear of the chuck body. The piston devices 18, 19 are respectively provided with port openings 39 and 40 which, when supplied with pressure fluid simultaneously shift both of the pistons in a direction to move the clamp members 8 and jaws 9 inwardly toward a clamping position, and each of the ports 39 and 40 are connected with the pipe channel 36 by suitable pipe fittings and holes, not shown, drilled in the body portion 1 whereby to simultaneously operate both piston devices to move the members 8 and jaws 9 in the clamping direction whenever pressure fluid is received through the channel 30, Fig. 1.

Each of the piston devices 18, 19 are provided with ports such as 41, 42, similarly connected to simultaneously receive fluid from the pipe channel 37 and supply channel 31 for movement of the chuck jaws in the reverse, or unclamping direction.

A pressure indicator, generally denoted by the numeral 43 is connected to receive pressure fluid from the same channel which supplies the ports 39 or 40, whereby to indicate the fluid pressure operative during a clamping operation. This device may be of any suitable form, providing relatively movable scale and indicator members, whereby the pressure may be visibly indicated, and since a variety of such indicators are well known it will not be described in detail. The device may be positioned at any suitable point on the chuck body but preferably within the confines of the body annulus, whereby it will be protected during rotation of the chuck.

Within the chuck body portion 1, and between the channel 34 and 36, whereby to be in the pressure line which effects the clamping direction of movement and also operates the indicator 43, is a pressure regulating device generally denoted by the numeral 44, Fig. 1B. This device includes a plunger 45 carried within a sleeve 46 and having a central groove 47 normally providing a path of communication between an inlet port 48 connected with the channel 34, and an outlet port 49 connected with the pipe channel 36. The end 50 of the plunger 45 is exposed to the pressure from inlet port 48, through a channel 51, such pressure tending to move the plunger 45 downwardly in Fig. 1B against the resistance of a spring 52, the one end of the spring abutting an adjustable screw member 53 by the means of which the spring pressure may be adjusted. The area of the plunger end 50 is so proportioned relative to the strength of the spring 52 that the spring will maintain the plunger in position to open the port 48 so long as the pressure in channel 36 does not exceed predetermined maximum. If this maximum is exceeded the pressure acting on the end 50 of the plunger will force the plunger to a position closing the port 48. It is obvious that the point of predetermined pressure can be altered by adjusting the spring abutment screw 53, and the actual pressure point at which the pressure is cut off, may be determined by the reading of the indicator 43. This is very useful, for instance, where pieces which might be deformed under heavy pressure are to be held in the clamp jaws.

In the chuck described, unless prevented, fluid may pass along the pistons 20 toward the pins which connect the pistons with ring 12, and leak out of the chuck around the ring 12 and members 8. In order to avoid such leakage the following means are provided: In the surface of the pistons 20, and completely surrounding the space occupied by the connecting pins, there is provided a groove such as the groove 54, Figs. 1 and 1A.

Figure 1E:
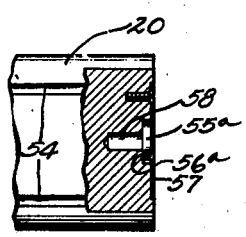
Fig. 1E shows a portion of one of the pistons of the chuck shown in Fig. 1, partly in section.
Figure 1F:
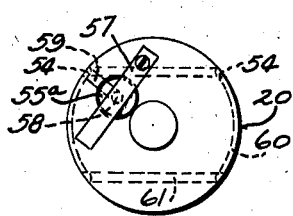
Fig. 1F shows an end view of the piston portion shown in Fig. 1E.

Fluid which otherwise would leak out as described is received in the grooves 54 before it reaches the connecting pins. Grooves 54 are connected to one way valves 55, 56 at each end thereof, permitting fluid to pass outwardly into the cylinder portions adjacent the piston but not inwardly toward the groove. These valves each include a member 55a. Figs. 1E, 1F, retained against a valve seat 56a by means of a member 57. Channels such as 58, Figs. 1, 1E are connected to receive fluid from the grooves 54 through drilled holes such as 59. The normal control and operation of the piston devices 18, 19, requires that one or the other end of the pistons shall be free from pressure. Therefore, by reason of the plurality of one way valves 55, it results that there is at all times one end of each cylinder which may receive the leakage fluid from the channel 54, which then passes out of the chuck through the cylinder port and through the one or the other of the spindle passages 30, 31.

The area enclosed within the leakage receiving groove 54 is, by the construction described, relieved from pressure, and to balance the piston pressure there are provided grooves, such as groove 60, Fig. 1A, similar to grooves 54 and enclosing an equal area on the opposite side of the pistons. The groove 60 and the groove 54 are connected by drilled channels such as 61 in order that the fluid from both grooves 54, 60 may pass out through the one way valves.

Fig. 2 shows a modified form of the chuck shown in Fig. 1, in which there are provided two axially spaced sets of movable clamping jaws respectively denoted by the numerals 62, 63, Fig. 2A, each set providing three equi-angularly spaced jaws such as 64, 65, 66, Fig. 2.

For the chuck of Fig. 2 the chuck body includes a rear member 67 providing an annular recess 68 for fitting to the spindle similarly to the chuck shown in Fig. 1. An intermediate member 67a and a front member 67b are each carried by the rear plate member 67 and the several members together provide a substantially annular body. The intermediate body member 67a provides annular grooves for guiding two annular rings 70, 71, respectively connected for movement of the clamp members of the different sets of chuck jaws 62, 63 by pins, cam grooves, and follower rolls which are similar to those described for the chuck shown in Fig. 1 and which therefore will not be described in detail. For each of the rings 70, 71, there are provided two operating pistons, each connected by pins for the movement of one of the rings in a manner similar to that described for the connection of the pistons and rings of the chuck shown in Fig. 1. Thus the pistons 72, 73 are each connected for the movement of the ring 71, and the pistons 74, 75 are each connected for the movement of the ring 70. The pistons of each pair of the different pairs are so spaced that all the pistons are equi-angularly spaced to effect a running balance of the chuck.

The channels within the chuck body of the chuck shown in Fig. 2, for the connection of the fluid supply channels to the different pistons, differ somewhat from those shown for the chuck of Fig. 1, being as follows: The intermediate body portion 67a is provided with an annular groove 77a, Figs. 2A, 2B, within which are retained tubes 77, 78, the tubes being permanently embedded as, for instance, in solder, to provide two annular passageways. The passageways 77, 78 are respectively connected with different inlet channels, similar to the channel 79, Fig. 2B, in the chuck supporting spindle such as 80, by the means of pressure coupling members, such as 80a, and drilled channels such as 80b, 80c, 80a. From the channels 77, 78 suitable drilled channels, not shown, in the intermediate body member 67a connect the channels to the supply ports of the different pistons, as will now be described.

Each of the pistons is provided with a pair of fluid ports such as the pairs 81, 82; 83, 84; 85, 86; 87, 88, the different ports for each piston being respectively for opposite piston movement, and the ports of each of the pairs of pistons 72, 73 and 74, 75 being so connected, similarly to the chuck of Fig. 1, that both the pistons of a pair simultaneously urge chuck jaws connected therewith either for clamping or unclamping. In addition, the ports of each of the pairs of pistons are interconnected to receive fluid to urge both sets of jaws simultaneously in the clamping direction or simultaneously in the unclamping direction.

Thus, assuming that the cam and pin connection from each of the rings 70, 71 to the members which carry the jaws is such that rotation of the rings in the same direction about the axis of the chuck annulus serves to move both sets of chuck jaws in clamping direction, or both sets in reverse direction, the connection of the annular supply channels 77, 78 to the different piston ports would be as diagrammatically indicated in Fig. 2C. If the cam and pin connections from the one ring 70 or 71 were reversed, whereby the rings rotate in opposite direction to effect the clamping direction of jaw movement, then the channel and port connections, for one or the other piston pairs 72, 73 or 74, 75 would be correspondingly reversed from that shown in Fig. 2C.

The preceding paragraph and the diagram Fig. 2C assumes that the clamp jaws of both sets 62 and 63 move in the same radial direction, that is to say that all the chuck jaws move either toward the axis of the chuck annulus or in the opposite direction, for effecting clamping. Certain operations may require the one set of jaws to move toward the axis and the other set to move oppositely to effect clamping, as for instance where the jaws of set 62, Fig. 2a move inwardly to clamp on the exterior of a work piece, and the jaws of set 63 move outwardly to clamp within a bore of the same work piece. To effect such result it is only necessary to correspondingly change the connection of the channels 77, 78 with the piston ports, or change the cam slots 14, as will be obvious from what has gone before.

Fig. 3 shows another modified form of chuck which, similarly to the chuck of Fig. 2, incorporates two axially spaced sets of chuck jaws generally denoted by the numerals 89 and 90 respectively. It also incorporates movable members for mounting the chuck jaws, such as the member 91 of the set 89 and the member 92 of the set 90, and cam follower rolls such as the roll 93 operating in cam grooves such as the groove 94, in each of the clamp jaw carrier members, in the manner similar to the chucks of Figs. 1 and 2. In this chuck, similarly to the chuck of Fig. 2, there are also included annular rings 95, 96 respectively for operation of the different sets of jaws, and through which pins such as 97, 98 are extended to carry the cam follower rolls. It will thus be seen that the jaws of each set 89, 90, may be, and ordinarily are, constrained to move simultaneously in the same direction, that is to say, either in the clamping or in the reverse direction, the cams being formed, as described for the chucks of Figs. 1 and 2, to prevent pressure on the clamping jaws from acting in the reverse direction to move the actuating ring.

The chuck body of Fig. 3 is built up of several members. A rear plate member 99 provides an annular recess 100 for attachment of the chuck to a spindle, similar to the chucks previously described. The body also includes a front plate portion 101 and a plurality of intermediate portions 102, 103, the several body portions being rigidly fixed together to form a unitary chuck body by any suitable means such as screws 104, a plurality of such screws being used, some of which retain the front plate with the intermediate members, as shown, and some, not shown, retaining the rear plate. The chuck body is generally annular in form and co-axial with the spindle aligning recess 100, as for the chucks previously described.

The pistons for the operation of the chuck jaws are in this instance in the form of segments of an annular ring, each being similar to the piston 105, Figs. 3, 3A. There are six of these segmental pistons substantially equi-angularly spaced in an annular groove 106 formed in the intermediate body member 102, and there are also six equi-angularly spaced chuck jaws. By this arrangement the pins 97, 98, etc., which carry the cam rolls, may be extended to be received centrally in the different pistons and the equi-angular arrangement also provides a chuck which is substantially in running balance so long as the body annulus of the chuck is co-axial with the spindle upon which it is mounted, as previously described.

By reason of the piston construction and arrangement described each of the pistons may act as an abutment for the adjacent pistons. Fluid is supplied from the spindle to the body annulus for distribution to the various pistons through a plurality of spindle channels such as the channels 107, Fig. 3B, in the spindle 107a, there being for each channel a compression coupling such as 108. In the chuck body, similarly to the chuck shown in Fig. 2, there is an annular groove 109 carrying a plurality of embedded tubes 110, 111, providing annular passageways to which port openings leading to the several pistons may be connected as by drilled holes, not shown, as diagrammatically indicated in Fig. 3C. Thus, between each of the pistons 105 there is an annular space such as 112, Fig. 3C and centrally located relative to these spaces are the port openings 113, 114, 115, 116, 117, 118. The spindle channels 107 may be connected to supply the channels 111, 112 directly, or through channels such as 108a, Fig. 3B, connecting to suitable of the annular spaces 112. The alternate ports are each connected to one of the channels 110, 111 and the other ports to the other channel as indicated in the diagram. Assuming that the channel 110 is the pressure channel, then the channel 111 would be suction or discharge. During such condition the piston 105, uppermost in Fig. 3C, would be urged clockwise in its annular groove by the pressure received from the port 113. Similarly, every alternate piston would be urged to move clockwise. Each such alternate piston is connected by the pins such as 97 or 98, Fig. 3A, with one of the annular rings 95, 96, whereby the alternate pistons form a set of pistons simultaneously tending to rotate one of the rings clockwise when the port 113 is a pressure port. The pistons lying between the set of pistons just described, however, would be simultaneously urged in the opposite direction. Thus, when port 113 is a pressure port the piston at the left of the upper piston in Fig. 3C, and every alternate piston would be urged anti-clockwise. These other pistons being similarly connected with the other ring also urge the other ring anti-clockwise.

In the chuck shown in Fig. 3, therefore, the rings 95 and 96 are simultaneously rotated, but in opposite directions, whenever pressure fluid is applied to the one or the other of channels 110, 111, but any of the jaws of either set 89, 90 may be moved in either direction as desired, merely by providing the cam tracks 94 with relative angular relationship to suit the individual jaw movement required. This obviously is also true with respect to the relative movement of the jaws of the chucks of Figs. 1 and 2.

Either of the chucks shown in Figs. 2 or 3 may be operated to move only one of the two sets of clamp jaws. In such case it would only be necessary to lock the annular jaw operating ring against rotation by any suitable means, as for instance a dowel pin, now shown, simultaneously engaging the ring and the chuck body.

When the chuck shown in Fig. 3 is constructed to have only one set of clamp jaws, as for instance the front set 90, the annular ring and connections to the other set of jaws are left out, along with the jaws. In such case alternate segmental members forming the pistons 105 are not left out, but are rigidly fixed in the chuck body, providing abutments against which the fluid pressure may operate. The channel diagram Fig. 3C would remain the same for such construction.

Each of the segmental pistons of the chuck shown in Fig. 3 is provided with leakage collecting grooves on both faces similar to those previously described for the chuck shown in Fig. 1, the grooves being somewhat diagrammatically indicated at 119, Fig. 3, for the upper piston, together with one way valves 120 and 121 connecting the leakage channel to deliver fluid to the suction end of the piston. It is further contemplated that for both types of pistons conventional packing, not shown, may be used.

In the chuck shown in Fig. 3, there is shown an alternative form of clamping jaw 122, which may be used in any of the chucks previously described, it being only necessary that the slots which carry the front set of clamping members be extended through the front plate so that the jaw member 122 may be movable therein.

Preferably, in such case the members are provided with T slots such as 123 in which the T bolts such as 124 are adjustable to lock the jaws 122 in various positions of radial adjustment relative to the carrying member. In such case, the opposed faces of the carrying members and jaws 122 may be provided with interlocking mutually engaged portions such as indicated at 125 which permit of adjustment while providing a positive coupling. Relative adjustment is particularly useful where the part to be held in the chuck is of irregular shape. The construction shown permits of individual adjustment of the jaws to accommodate such irregularity.

It will be understood that, although the pressure control valve 44 and the pressure indicating device 43, are shown only in connection with the chuck of Fig. 1, these or similar pressure control and indicating devices are also intended to be used with the chucks shown in Figs. 2 and 3. As explained for the chuck shown in Fig. 1, the pressure regulating device 44 will in each instance where used be situated in the supply line which provides the clamping direction of movement of the chuck jaws, and the indicating device 43 will derive its fluid pressure for the operation of the indicator from the same line.

What is claimed is:

1. In a chuck device, the combination of a chuck body, a movable clamping jaw carried thereby, a piston device within said body, a mechanical connection from said piston device to said jaw, a pressure liquid channel means carried by said body and connected for movement of said piston means, said body providing an aperture for said connection through which liquid passing said piston may leak unless prevented, a leak receiving channel within said body and associated with and surrounding said opening in a manner to intercept and receive liquid which would otherwise pass therethrough, and another channel connected to said leak receiving channel and connected to pass the liquid received therein to a point remote from said jaw and exterior to said chuck body.

2. In a chuck device, the combination of a chuck body, a movable clamping jaw carried by said body, a piston device carried by and housed within said body, a mechanical motion transmitting connection from said piston device to said jaw channel means carried by and housed within said body, including a plurality of channels respectively connected for delivery of pressure liquid to said piston for piston movement in opposite directions, said body providing a passageway for said mechanical connection through which liquid may leak to undesired points adjacent said jaw unless prevented, another channel associated with and surrounding said passageway in a manner to intercept and receive liquid which would otherwise pass therethrough to said undesired points, and channel means connected to deliver liquid received by said other channel to a point remote from said jaw and exterior to said chuck body.

3. In a clamping device including a clamping member movable in opposite directions, the combination of piston means connected for said opposite member movement, a plurality of supply channels respectively for movement of said piston device in opposite directions, channel means adapted to intercept and receive fluid leaking past said piston means in either direction of movement thereof, and a plurality of one way valve devices respectively connecting said leakage channel means to deliver fluid to different of said supply channels.

4. In a chuck device the combination of a chuck body, a jaw member carried by said body and movable in opposite directions, a piston device carried by said chuck body, a mechanical motion transmitting connection from said piston device for said opposite movement, a plurality of pressure liquid supply channels each connected with said piston device and respectively for movement thereof in opposite directions, said body providing a passageway for said mechanical connection through which liquid may pass to undesired points adjacent said jaw unless prevented, another channel associated with and surrounding said passageway in a manner to intercept and receive liquid which would otherwise pass therethrough to said undesired points, and a plurality of one way valve devices respectively connecting said other channel to deliver fluid to different of said supply channels while preventing passage of fluid from either of said supply channels to said other channel.

5. In a chuck the combination of a substantially annular body portion, a plurality of clamp members relatively movable adjacent one end face of the body annulus, said body providing a substantially closed annular chamber substantially co-axial with said annulus, a piston device including an annular ring segment fitted within said chamber and movable in opposite directions therein, a motion transmitting connection from said segment for relative movement of said members, and a fluid supply channel connected to apply pressure to the one end of said segment for movement thereof in one direction and terminating adjacent the other end of said annulus to receive fluid from a source exterior to said body.

6. In a chuck the combination of a substantially annular chuck body, a plurality of clamp members relatively movable adjacent one end face of the body annulus, a piston device carried by and housed within said body annulus, a mechanical connection from said piston device for said relative movement including elements coacting to prevent movement of the piston device from said members, a supply channel connected to said piston device within said annulus and terminating adjacent the other end face thereof to receive fluid from a source exterior to said body, channel means within said annulus adapted to intercept and receive fluid leaking past said piston device, and a channel connected to said channel means and terminating adjacent said other end of the annulus to deliver fluid to a point outside said body.

7. In a chuck the combination of a substantially annular chuck body, a plurality of clamp members relatively movable adjacent one end face of the body annulus alternatively in clamping and unclamping directions, a piston device carried by and housed within said body annulus, a mechanical connection from said piston device to some of said clamp members for said relative movement including elements irreversibly coacting to prevent movement of the piston device from said members, a plurality of supply channels each connected to said piston device within said body and respectively for piston movement in clamping and unclamping directions, and a pressure control means wholly within said annulus and regulating the clamping pressure, for the clamping direction of piston movement of said control means including an adjustable portion exposed for adjustment.

8. A chuck as specified in claim 7, and including a pressure indicating device housed within said body annulus, and connected for operation from said clamping pressure supply channels at a point between said pressure control device and said piston device.

9. In a liquid operable piston device the combination of a piston, a cylinder member substantially enclosing said piston and providing pressure chambers respectively at opposite piston ends, a motion transmitting connection including an element positioned at an intermediate point between the ends of said piston and extending through a wall of said cylinder member, pressure channel means for the supply of liquid to said chambers, a leakage collecting groove associated with said piston, and interposed to receive liquid leaking from either of said chambers along said element, and a drain channel communicating with said groove, whereby to avoid leakage at the point where said element extends through said cylinder wall.

10. In a liquid operable piston device the combination of a piston, a cylinder member substantially enclosing said piston and providing pressure chambers respectively at opposite piston ends, a motion transmitting connection including an element positioned at an intermediate point between the ends of said piston and extending through a wall of said cylinder member, pressure channel means for the supply of liquid to said chambers, a leakage collecting groove associated with said piston, and interposed to receive liquid leaking from either of said chambers along said element, and a drain channel communicating with said groove, said leakage collecting groove being of substantially equal lateral pressure area on laterally opposite sides of said piston whereby to prevent unbalanced pressures urging said piston laterally.

11. In a chuck the combination of a substantially annular body portion, a plurality of clamp members relatively movable adjacent one end face of the body annulus, said body providing a substantially closed annular chamber substantially coaxial with said annulus, piston means including a plurality of annular ring segments spaced apart within said chamber, a motion transmitting connection from each of said segments to some of said clamp members for relative movement of said clamp members, and a fluid supply channel originating adjacent the other end of said annulus and connected to apply pressure fluid for simultaneous movement of said segments.

12. In a chuck the combination of a substantially annular body portion, a plurality of clamp members relatively movable adjacent one end face of the body annulus, said body providing a substantially closed annular chamber substantially coaxial with said annulus, piston means including a plurality of annular ring segments equi-angularly spaced apart within said chamber, a motion transmitting connection from each of said segments to some of said clamp members for said relative movement of the clamp members, elements fixed in said chamber between said segments to substantially laterally fill said chamber and equi-angularly spaced, and a fluid supply channel originating adjacent the other end of said annulus and connected for the supply of fluid for movement of each of said segments.

13. In a chuck device the combination of a substantially annular chuck body, a plurality of jaw members relatively movable adjacent one end face of the body annulus, a plurality of pistons equi-distant from the center of said annulus and equi-angularly spaced, said pistons each being reciprocable in a path tangent to a circle struck from said center, motion transmitting connections from each of said piston devices to some of said jaw members for said relative jaw movement and a pressure fluid channel originating adjacent the other end of said body annulus and connected for operation of each of said pistons.

LOUIS EDWARD GODFRIAUX.